US 12,513,792 B2

(12) United States Patent
Wang et al.

(10) Patent No.: US 12,513,792 B2
(45) Date of Patent: Dec. 30, 2025

(54) HEATING DEVICE AND REFRIGERATOR WITH HEATING DEVICE

(71) Applicant: HAIER SMART HOME CO., LTD., Shandong (CN)

(72) Inventors: Haijuan Wang, Qingdao (CN); Peng Li, Qingdao (CN)

(73) Assignee: HAIER SMART HOME CO., LTD., Shandong (CN)

( * ) Notice: Subject to any disclaimer, the term of this patent is extended or adjusted under 35 U.S.C. 154(b) by 898 days.

(21) Appl. No.: 17/420,481

(22) PCT Filed: Dec. 11, 2019

(86) PCT No.: PCT/CN2019/124654
§ 371 (c)(1),
(2) Date: Jul. 2, 2021

(87) PCT Pub. No.: WO2020/140709
PCT Pub. Date: Jul. 9, 2020

(65) Prior Publication Data
US 2022/0086973 A1    Mar. 17, 2022

(30) Foreign Application Priority Data

Jan. 4, 2019 (CN) .......................... 201920013453.6

(51) Int. Cl.
*H05B 6/80* (2006.01)
*F25D 11/02* (2006.01)
(Continued)

(52) U.S. Cl.
CPC .............. *H05B 6/80* (2013.01); *F25D 11/02* (2013.01); *F25D 23/12* (2013.01); *F25D 29/00* (2013.01); *F25D 2400/02* (2013.01)

(58) Field of Classification Search
CPC . H05B 6/80; F25D 11/02; F25D 23/12; F25D 29/00
(Continued)

(56) References Cited

U.S. PATENT DOCUMENTS

| 3,467,938 A * | 9/1969 | Jahr ...................... F25D 23/028 439/31 |
| 5,329,418 A * | 7/1994 | Tanabe ...................... G06F 1/20 361/695 |
| 2003/0230571 A1* | 12/2003 | Jeong ................... H05B 6/6429 219/400 |

FOREIGN PATENT DOCUMENTS

| CN | 209897300 U | 1/2020 |
| CN | 209897306 U | 1/2020 |

(Continued)

OTHER PUBLICATIONS

Machine Translation of WO2011118198A1 (Year: 2024).*
(Continued)

*Primary Examiner* — Edward F Landrum
*Assistant Examiner* — Thomas J Ward
(74) *Attorney, Agent, or Firm* — troutman pepper locke; Tim Tingkang Xia, Esq.

(57) ABSTRACT

Provided is a heating device and a refrigerator. The heating device includes a cylinder body provided with a pick-and-place opening, a door body configured to open and close the pick-and-place opening, an electromagnetic generating module configured to generate an electromagnetic wave signal, and a radiating antenna. The radiating antenna is configured to be electrically connected with the electromagnetic generating module to generate electromagnetic waves of a corresponding frequency according to the electromagnetic wave signal. The heating device further includes a signal processing and measurement and control circuit for measurement and control processing of the electromagnetic (Continued)

wave signal. The signal processing and measurement and control circuit is configured to be electrically connected with the electromagnetic generating module and is disposed at a rear lower part in the cylinder body.

9 Claims, 8 Drawing Sheets

(51) Int. Cl.
*F25D 23/12* (2006.01)
*F25D 29/00* (2006.01)

(58) Field of Classification Search
USPC .......................................................... 219/679
See application file for complete search history.

(56) References Cited

FOREIGN PATENT DOCUMENTS

| | | | | |
|---|---|---|---|---|
| JP | S52-38639 | U | 3/1977 | |
| JP | S59-71286 | A | 4/1984 | |
| JP | S61-188881 | A | 8/1986 | |
| JP | 2000-100555 | A | 4/2000 | |
| JP | 2001124343 | A * | 5/2001 | ........... F25D 31/005 |
| JP | 2004-317071 | A | 11/2004 | |
| JP | 2009229037 | A | 10/2009 | |
| JP | 4-423120 | B2 | 3/2010 | |
| JP | 2011182690 | A | 9/2011 | |
| JP | 2013-036643 | A | 2/2013 | |
| JP | 2013029220 | A | 2/2013 | |
| JP | 2018-025311 | A | 2/2018 | |
| RU | 2372565 | C2 | 11/2009 | |
| WO | WO-2011118198 | A1 * | 9/2011 | ........... F25D 31/005 |
| WO | WO 2017/123145 | A1 | 7/2017 | |

OTHER PUBLICATIONS

Machine Translation of JP2001124343A (Year: 2024).*
1st Office Action for JP application No. 2021-538830 (3 pages).
1st Office Action for AU Application No. 2019419626 dated May 16, 2022 (3 pages).
1st Office Action for EP Application No. 19907413.9 dated Feb. 9, 2022 (8 pages).
2nd Office Action for EP Application No. 19907413.9 dated Jun. 28, 2022.
1st Office Action for India Patent Application No. 202137031670 dated Feb. 25, 2022 (7 pages).
1st Office Action for Russian Application No. 2021122186 dated Jan. 31, 2022 (5 pages).
Supplementary European Search Report for EP Application No. 19907413 dated Jan. 28, 2022 (4 pages).
Search Report for Russian Application No. 2021122186, dated Jan. 31, 2022 (2 pages).
International Search Report for PCT/CN2019124654 (ISA/CN) mailed Mar. 17, 2020 (7 pages).

* cited by examiner

HEATING DEVICE AND REFRIGERATOR WITH HEATING DEVICE

CROSS-REFERENCE TO RELATED APPLICATIONS

The present application is a national phase entry of International Application No. PCT/CN2019/124654, filed Dec. 11, 2019, which claims priority to Chinese Patent Application No. 201920013453.6, filed Jan. 4, 2019, which are incorporated herein by reference in their entirety.

TECHNICAL FIELD

The present invention relates to kitchen appliances, and particularly relates to an electromagnetic wave heating device and a refrigerator with the heating device.

BACKGROUND ART

In the freezing process of food, the quality of the food is maintained, but the frozen food needs to be thawed before processing or eating. In order to facilitate users freezing and thawing the food, in the prior art, the food is thawed generally by adding an electromagnetic wave device to a refrigerating and freezing device.

However, not only the dielectric coefficients of foods with different attributes are different, but the dielectric coefficients of foods with the same attributes will also change as the temperature changes during the thawing process, so that the absorption rate of electromagnetic waves by the foods fluctuates up and down. By comprehensive consideration, a heating device with high heating efficiency and a refrigerator with the heating device are required in design.

SUMMARY OF THE INVENTION

An objective of the first aspect of the present invention is to provide a heating device with a large storage space.

A further objective of the first aspect of the present invention is to avoid potential safety hazards.

Another further objective of the first aspect of the present invention is to improve the heating efficiency.

An objective of the second aspect of the present invention is to provide a refrigerator with the heating device.

According to the first aspect of the present invention, provided is a heating device, including: a cylinder body, provided with a pick-and-place opening and configured to place an object to be processed;

a door body, disposed at the pick-and-place opening and configured to open and close the pick-and-place opening;

an electromagnetic generating module, configured to generate an electromagnetic wave signal; and a radiating antenna, configured to be electrically connected with the electromagnetic generating module to generate electromagnetic waves of a corresponding frequency according to the electromagnetic wave signal, wherein the heating device further includes:

a signal processing and measurement and control circuit, configured to be electrically connected with the electromagnetic generating module and disposed at a rear lower part in the cylinder body.

Optionally, the signal processing and measurement and control circuit is integrated on a circuit board.

Optionally, the cylinder body is made of a metal and is configured to be grounded; and the heating device further includes:

a metal bracket, configured to connect the circuit board and the cylinder body.

Optionally, the heating device further includes:

a housing, configured to separate an inner space of the cylinder body into a heating chamber and an electrical appliance chamber, wherein the object to be processed and the circuit board are respectively disposed in the heating chamber and the electrical appliance chamber.

Optionally, the circuit board is horizontally disposed; and a clamping tongue extending upward and inward is respectively formed on two lateral side walls of the housing, and the circuit board is clamped above two clamping tongues.

Optionally, the signal processing and measurement and control circuit includes:

a control unit, configured to be electrically connected with the electromagnetic generating module and used to control start and stop of the electromagnetic generating module.

Optionally, the signal processing and measurement and control circuit includes:

a matching unit, connected in series between the electromagnetic generating module and the radiating antenna, and configured to adjust a load impedance of the electromagnetic generating module.

Optionally, the signal processing and measurement and control circuit further includes:

a detection unit, connected in series between the electromagnetic generating module and the radiating antenna, and configured to detect specific parameters of an incident wave signal and a reflected wave signal passing through the detection unit; and a control unit, configured to calculate an electromagnetic wave absorption rate of the object to be processed according to the specific parameters, and wherein the matching unit is configured to adjust the load impedance of the electromagnetic generating module according to the electromagnetic wave absorption rate.

Optionally, the cylinder body is provided with a plurality of heat dissipation holes in a position corresponding to the matching unit, so that heat generated by the matching unit during working is discharged through the plurality of heat dissipation holes.

According to the second aspect of the present invention, provided is a refrigerator, including: a cabinet, defining at least one storage compartment;

at least one cabinet door, configured to open and close the at least one storage compartment;

a refrigerating system, configured to provide cooling capacity to the at least one storage compartment; and a main control board, configured to control the refrigerating system to work, wherein the refrigerator further includes:

any one of the above heating devices, disposed in one of the storage compartments.

In the heating device of the present invention, the signal processing and measurement and control circuit is disposed at the rear lower part in the cylinder body, which not only can make the cylinder body have a relatively large storage space, but also can avoid the damage to the circuit due to excessively high food when a storage drawer is used for holding food.

Further, in the present invention, by configuring the metal cylinder body to be grounded, high-voltage electrostatic charges on the cylinder body can be discharged, thereby avoiding potential safety hazards such as electric leakage. In the present invention, the circuit board integrated with the signal processing and measurement and control circuit is conductively connected with the metal cylinder body, so that charges on the circuit board can be guided to the ground through the metal cylinder body, thereby not only avoiding the potential safety hazards, but also reducing the interference of electromagnetic waves to the circuit.

Further, in the present invention, the load impedance of the electromagnetic generating module is adjusted by the matching unit so as to improve a matching degree between the output impedance and the load impedance of the electromagnetic generating module, so that when foods with different fixed attributes (such as type, weight and volume) are placed in the heating chamber, or during the temperature change of the foods, relatively more electromagnetic wave energy is radiated in the heating chamber.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn to scale. In figures.

DETAILED DESCRIPTION OF THE INVENTION

Figure 1:
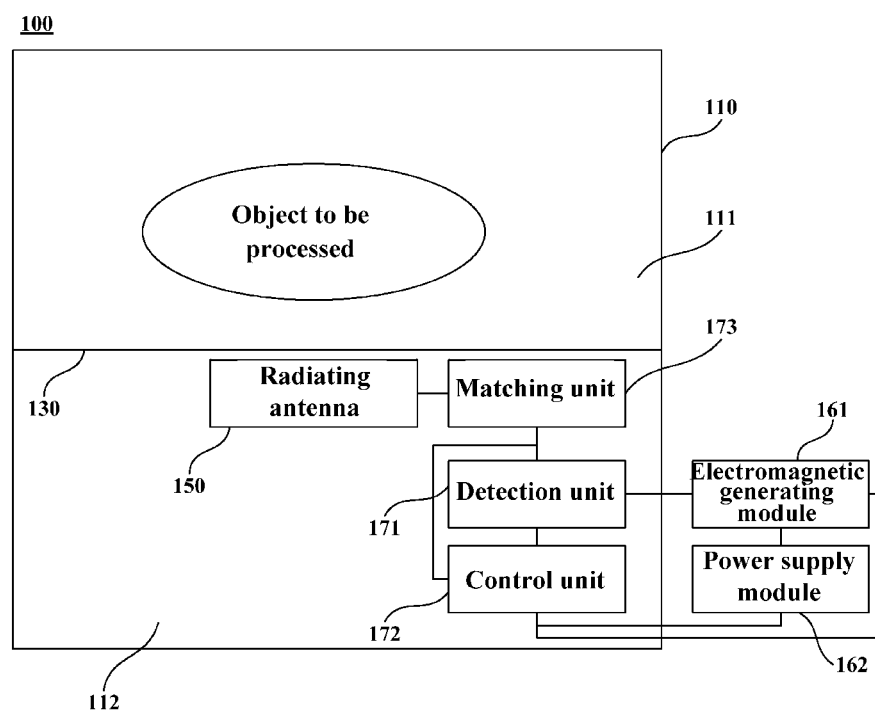
FIG. 1 is a schematic structural view of a heating device according to one embodiment of the present invention.
Figure 2:
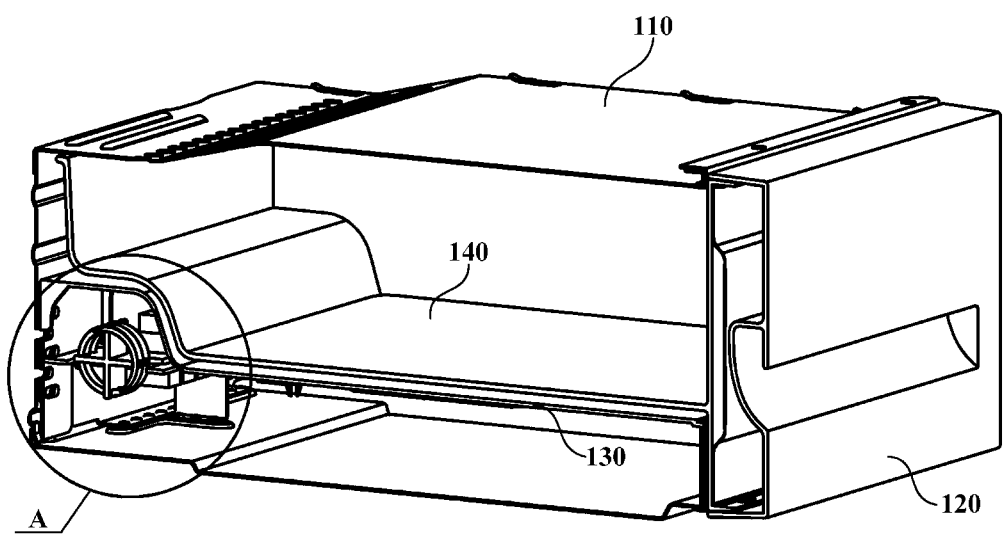
FIG. 2 is a schematic cross-sectional view of the heating device as shown in FIG. 1, wherein an electromagnetic generating module and a power supply module are omitted.

FIG. 1 is a schematic structural view of a heating device 100 according to one embodiment of the present invention. FIG. 2 is a schematic cross-sectional view of the heating device 100 as shown in FIG. 1, wherein an electromagnetic generating module 161 and a power supply module 162 are omitted. Referring to FIG. 1 and FIG. 2, the heating device 100 may include a cylinder body 110, a door body 120, an electromagnetic generating module 161, a power supply module 162 and a radiating antenna 150.

The cylinder body 110 may be configured to place an object to be processed, and a front wall or a top wall thereof may be provided with a pick-and-place opening for picking and placing the object to be processed.

The door body 120 may be installed together with the cylinder body 110 by an appropriate method, such as a sliding rail connection, a hinged connection, etc., and is configured to open and close the pick-and-place opening. In an illustrated embodiment, the heating device 100 also includes a drawer 140 for carrying the object to be processed; a front end plate of the drawer 140 is configured to be fixedly connected with the door body 120, and two lateral side plates of the drawer are movably connected with the cylinder body 110 by sliding rails.

The power supply module 162 may be configured to be electrically connected with the electromagnetic generating module 161 to provide electric energy to the electromagnetic generating module 161, so that the electromagnetic generating module 161 generates electromagnetic wave signals. The radiating antenna 150 may be disposed in the cylinder body 110 and is electrically connected with the electromagnetic generating module 161 to generate electromagnetic waves of corresponding frequencies according to the electromagnetic wave signals, so as to heat the object to be processed in the cylinder body 110.

The cylinder body 110 and the door body 120 may be respectively provided with electromagnetic shielding features, so that the door body 120 is conductively connected with the cylinder body 110 when the door body is in a closed state, so as to prevent electromagnetic leakage.

In some embodiments, the cylinder body 110 may be made of metals to serve as a receiving pole to receive electromagnetic waves generated by the radiating antenna 150. In some other embodiments, a receiving pole plate may be disposed on the top wall of the cylinder body 110 to receive electromagnetic waves generated by the radiating antenna 150.

Figure 3:
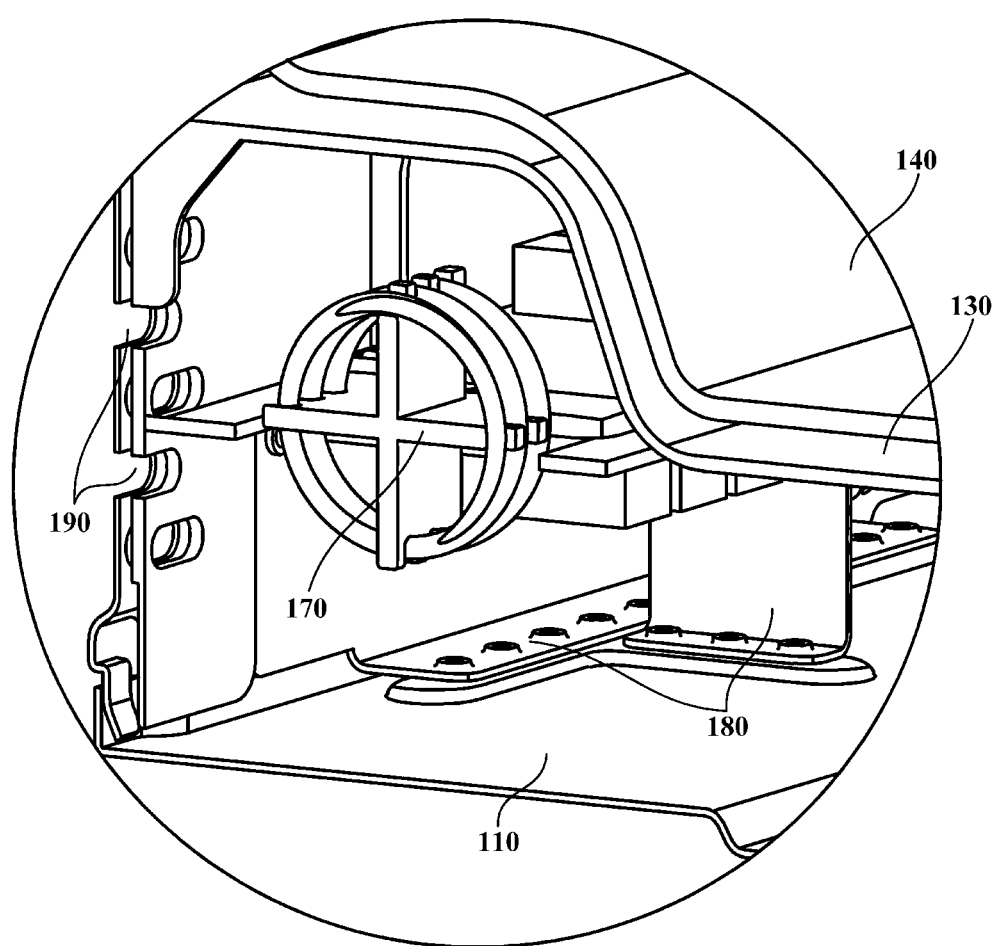
FIG. 3 is a schematic enlarged view of a region A in FIG. 2.

FIG. 3 is a schematic enlarged view of a region A in FIG. 2. Referring to FIG. 1 to FIG. 3, the heating device 100 may further include a signal processing and measurement and control circuit. Specifically, the signal processing and measurement and control circuit may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values. Alternatively, the detection unit 171 may be a power meter to directly measure the power of incident waves and reflected waves.

The control unit 172 may further calculate an electromagnetic wave absorption rate of the object to be processed according to the power of incident waves and reflected waves, compare the electromagnetic wave absorption rate with a preset absorption threshold, and send an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

In some embodiments, the matching unit 173 may include a first capacitor group, a second capacitor group and an inductor, and each capacitor group includes a plurality of parallel and independently controlled capacitors, wherein the input end of the first capacitor group is electrically connected with the electromagnetic generating module 161, and the output end of the first capacitor group is electrically connected with the input end of the inductor; the input end of the second capacitor group is connected in series between the output end of the first capacitor group and the input end of the inductor, and the output end of the second capacitor group is grounded; and the output end of the inductor is electrically connected with the radiating antenna 150, so as to realize multiple groups of impedance combinations by two capacitor groups. For example, when the number of capacitors in the first capacitor group is 4 and the number of capacitors in the second capacitor group is 6, the matching unit 173 may realize 24 impedance combinations.

In some embodiments, the heating device 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C., so that the foods have good shear strength. For example, when the object to be processed is raw beef, the preset change threshold may be set to 2.

The control unit 172 may also be configured to receive a trigger command for starting or stopping the thawing program, and send a corresponding control signal to the electromagnetic generating module 161 according to the trigger command, so that the electromagnetic generating module 161 starts or stops working. The control unit 172 is configured to be electrically connected with the power supply module 162 to obtain electric energy from the power supply module 162 and always in a standby state.

In some embodiments, the signal processing and measurement and control circuit may be integrated on a circuit board 170 to facilitate the installation and maintenance of the signal processing and measurement and control circuit.

The signal processing and measurement and control circuit may be disposed at the rear lower part in the cylinder body 110, which not only can make the cylinder body 110 have a relatively large storage space, but also can avoid the damage to the circuit due to excessively high food placed in the drawer 140. The rear part of the bottom wall of the drawer 140 may be configured to be recessed upward to form an enlarged space below the drawer.

Figure 4:
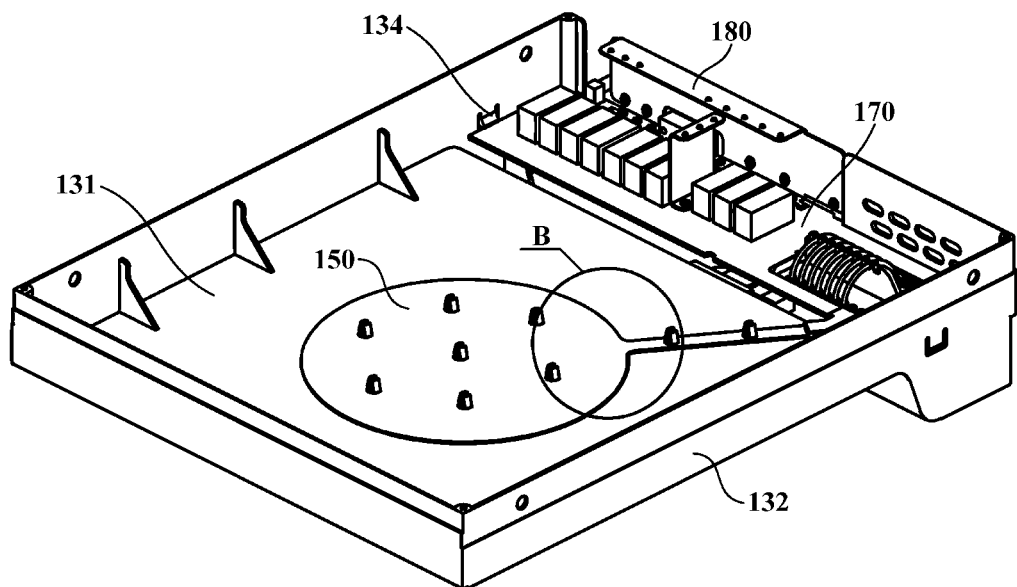
FIG. 4 is a schematic structural view of an electrical appliance chamber according to one embodiment of the present invention.

FIG. 4 is a schematic structural view of an electrical appliance chamber 112 according to one embodiment of the present invention. Referring to FIG. 2 and FIG. 4, the heating device 100 may further include a housing 130 to separate the inner space of the cylinder body 110 into a heating chamber 111 and an electrical appliance chamber 112. The object to be processed and the circuit board 170 may be respectively disposed in the heating chamber 111 and the electrical appliance chamber 112 to separate the object to be processed from the circuit board 170, so as to prevent the circuit board 170 from being damaged by accidental touch.

Specifically, the housing 130 may include a clapboard 131 for separating the heating chamber 111 and the electrical appliance chamber 112, and a skirt part 132 fixedly connected with the inner wall of the cylinder body 110.

In some embodiments, the circuit board 170 may be horizontally disposed. A clamping tongue 134 extending upward and inward may be respectively formed on two lateral side walls of the housing 130, and the circuit board 170 may be clamped above the two clamping tongues 134.

The housing 130 and the cylinder body 110 may be provided with heat dissipation holes 190 respectively in positions corresponding to the matching unit 173, so that the heat generated by the matching unit 173 during working is discharged through the heat dissipation holes 190.

In some embodiments, the radiating antenna 150 may be disposed in the electrical appliance chamber 112 to prevent the radiating antenna 150 from being dirty or damaged by accidental touch.

The housing 130 may be made of an insulating material, so that the electromagnetic waves generated by the radiating antenna 150 can pass through the housing 130 to heat the object to be processed. Further, the housing 130 may be made of a non-transparent material to reduce the electromagnetic loss of the electromagnetic waves at the housing 130, thereby increasing the heating rate of the object to be processed. The above-mentioned non-transparent material is a translucent material or an opaque material. The non-transparent material may be a PP material, a PC material or an ABS material, etc.

The housing 130 may also be configured to fix the radiating antenna 150 to simplify the assembly process of the heating device 100 and facilitate the positioning and installation of the radiating antenna 150, wherein the radiating antenna 150 may be configured to be fixedly connected with the clapboard 131.

Figure 5:
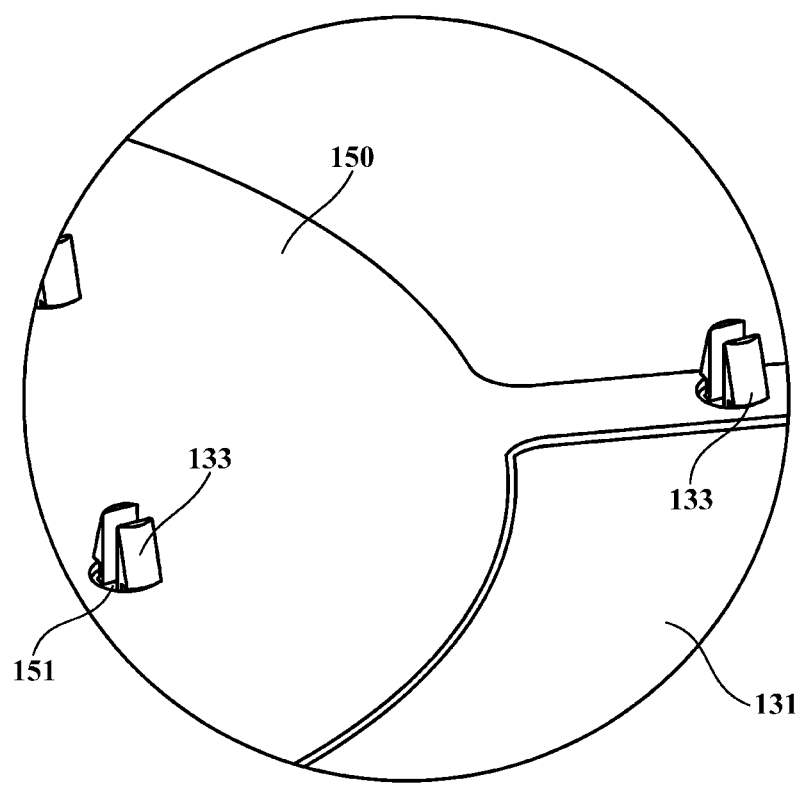
FIG. 5 is a schematic enlarged view of a region B in FIG. 4.

In some embodiments, the radiating antenna 150 may be configured to be engaged with the housing 130. FIG. 5 is a schematic enlarged view of a region B in FIG. 4. Referring to FIG. 5, the radiating antenna 150 may be provided with a plurality of engaging holes 151; the housing 130 may be correspondingly provided with a plurality of buckles 133, and the plurality of buckles 133 are configured to respectively pass through the plurality of engaging holes 151 to be engaged with the radiating antenna 150.

In one embodiment of the present invention, each of the buckles 133 may be composed of two baths disposed at an interval and in mirror symmetry.

Figure 6:
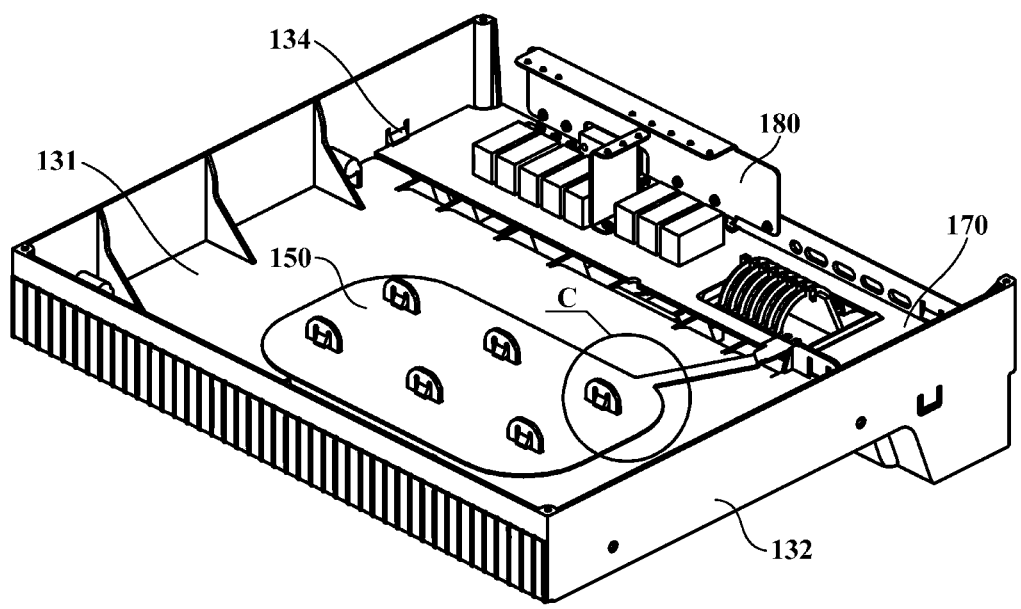
FIG. 6 is a schematic structural view of an electrical appliance chamber according to another embodiment of the present invention.
Figure 7:
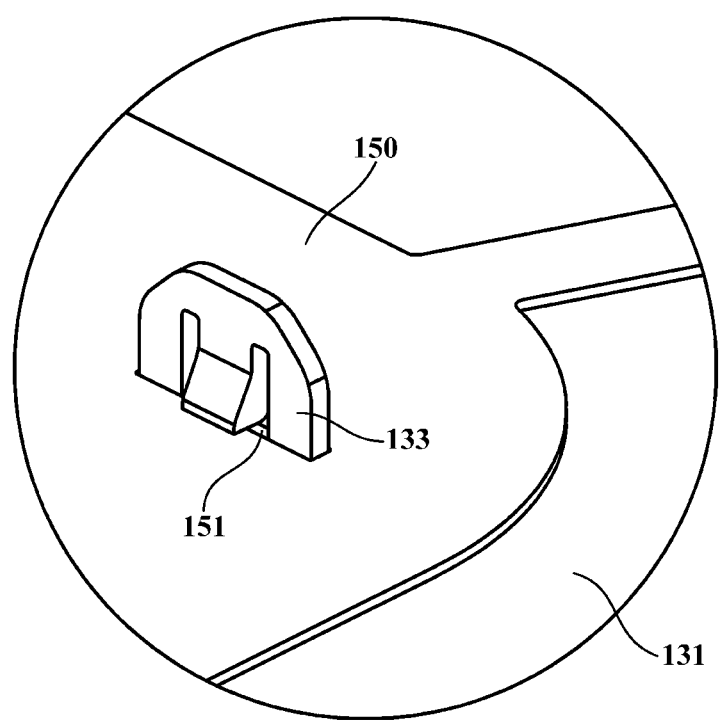
FIG. 7 is a schematic enlarged view of a region C in FIG. 6.

FIG. 6 is a schematic structural view of an electrical appliance chamber 112 according to another embodiment of the present invention. FIG. 7 is a schematic enlarged view of a region C in FIG. 6. Referring to FIG. 6 and FIG. 7, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the housing 130 through an electroplating process.

The housing 130 may further include a plurality of reinforcing ribs, and the reinforcing ribs are configured to connect the clapboard 131 and the skirt part 132 so as to improve the structural strength of the housing 130.

In some embodiments, the radiating antenna 150 may be horizontally disposed at the height of ⅓ to ½, such as ⅓, ⅖ or ½, of the cylinder body 110, so that the volume of the heating chamber 111 is relatively large, and meanwhile, the electromagnetic waves in the heating chamber 111 have a relatively high energy density so as to make the object to be processed heated quickly.

Referring to FIG. 4 and FIG. 6, the peripheral edge of the radiating antenna 150 may be formed by smooth curves, so as to make the distribution of electromagnetic waves in the cylinder body 110 more uniform, thereby improving the temperature uniformity of the object to be processed. A smooth curve refers to a curve of which the first derivative of the curve equation is continuous, which means that the peripheral edge of the radiating antenna 150 has no sharp corner in engineering.

In some embodiments, the metal cylinder body 110 may be configured to be grounded to discharge the electric charges thereon, thereby improving the safety of the heating device 100.

The heating device 100 may further include a metal bracket 180. The metal bracket 180 may be configured to connect the circuit board 170 and the cylinder body 110 to support the circuit board 170 and discharge the electric charges on the circuit board 170 through the cylinder body 110. In some embodiments, the metal bracket 180 may be composed of two parts perpendicular to each other. The metal bracket 180 may be fixedly connected with the housing 130 to facilitate the connection of the housing 130 and the metal bracket 180 with the cylinder body 110.

Figure 8:
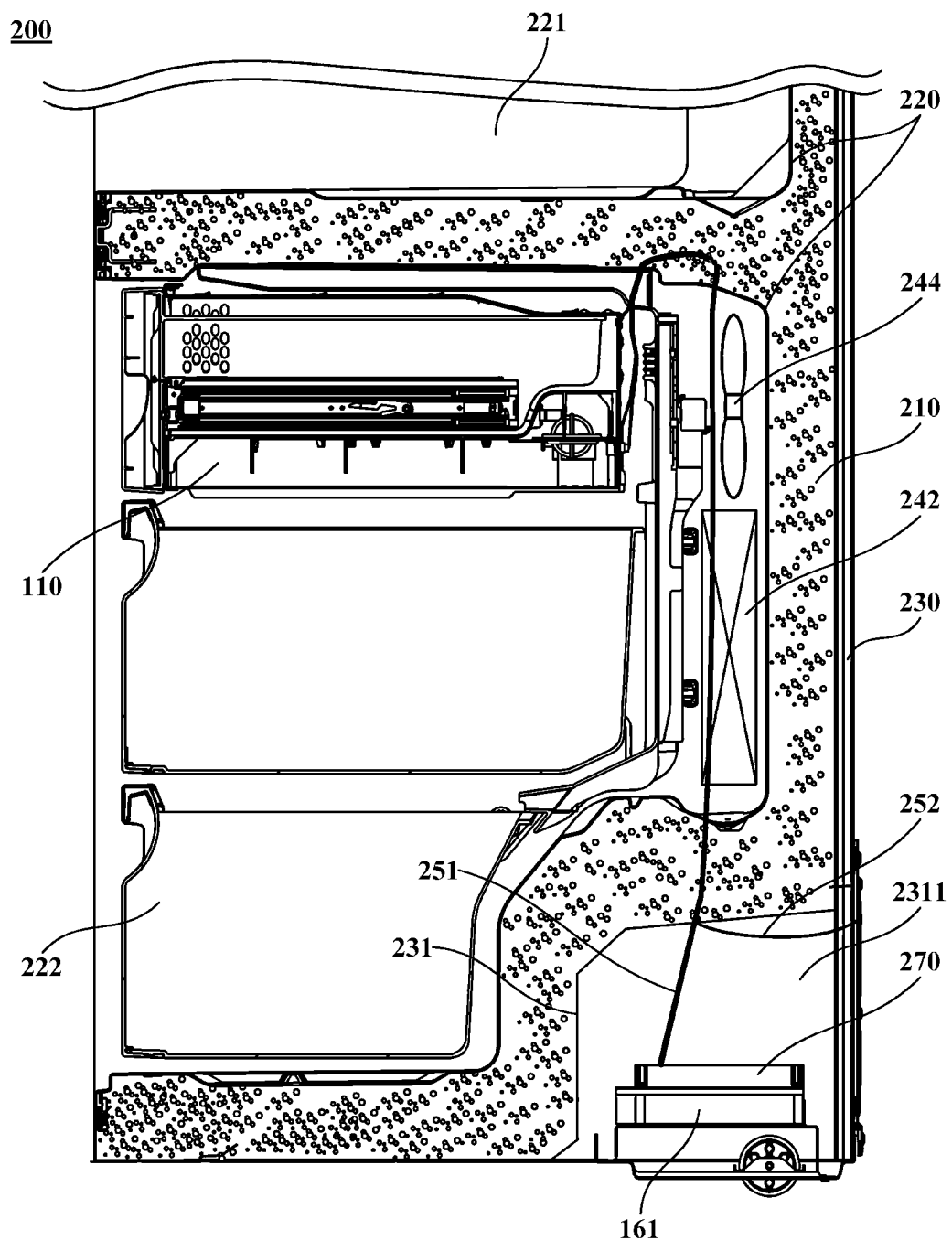
FIG. 8 is a schematic structural view of a refrigerator according to one embodiment of the present invention.

Based on the heating device 100 according to any one of the above embodiments, the present invention may further provide a refrigerator 200. FIG. 8 is a schematic structural view of a refrigerator 200 according to one embodiment of the present invention. Referring to FIG. 8, the refrigerator 200 may include a cabinet defining at least one storage compartment, at least one cabinet door configured to respectively open and close the at least one storage compartment, a refrigerating system configured to provide cooling capacity to the at least one storage compartment, and a main control board configured to control the refrigerating system to work. The cylinder body of the heating device 100 may be disposed in one storage compartment.

In the present invention, at least one means one, two, or more than two. The power supply module 162 of the heating device 100 may be powered by the main control board of the refrigerator 200, and the control unit 172 and the main control board of the refrigerator 200 may be independent of each other without information interaction.

In an illustrated embodiment, there are two storage compartments, namely a refrigerating compartment 221 and a freezing compartment 222 disposed under the refrigerating compartment 221. The cylinder body of the heating device 100 is disposed in the freezing compartment 222.

The refrigerating system may include a compressor 241, a condenser 243, an evaporator 242, a refrigerating fan 244 for blowing the cooling capacity generated by the evaporator 242 into the freezing compartment 222, and a heat dissipation fan 245 for heat dissipation of the condenser 243.

The cabinet may include an inner liner 220, a shell 230 and an insulating layer 210 disposed between the inner liner 220 and the shell 230. The shell 230 may include two side panels respectively located on two lateral sides of the insulating layer 210, bottom steel 231 located at the bottom of the insulating layer 210, and a back plate located at the rear part of the insulating layer 210.

The refrigerator 200 further includes a power line (not shown in the figure) for receiving commercial power, so as to supply power to the heating device 100 and the refrigerating system. The power line may include a grounding wire which is connected with a ground wire in the commercial power and is conductively connected with the bottom steel 231, so as to prevent the electric leakage of the refrigerator 200.

Figure 9:
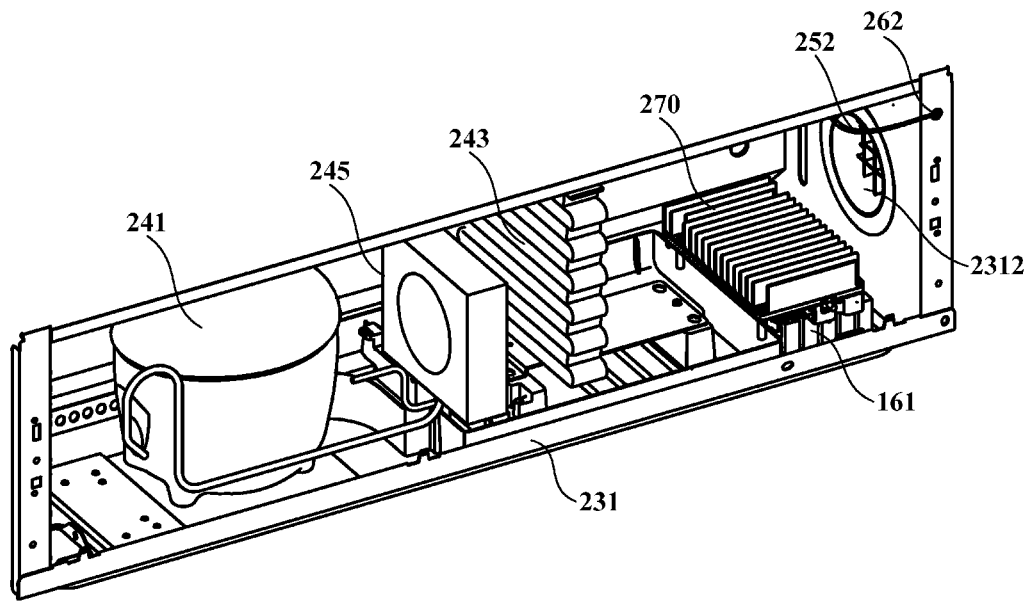
FIG. 9 is a schematic structural view of a compressor chamber in FIG. 8.

FIG. 9 is a schematic structural view of a compressor chamber 2311 in FIG. 8. Referring to FIG. 9, the bottom steel 231 defines a compressor chamber 2311, and the compressor 241, the condenser 243 and the heat dissipation fan 245 may be disposed in the compressor chamber 2311. Two lateral side walls of the compressor chamber 2311 may be respectively provided with an air vent 2312 to allow ambient air to enter the compressor chamber 2311 to dissipate heat from the condenser 243 and the compressor 241.

In some embodiments, the electromagnetic generating module 161 may be disposed in the compressor chamber 2311 to use the heat dissipation fan 245 to dissipate heat from the electromagnetic generating module 161. A heat dissipation fin 270 may also be disposed in the compressor chamber 2311 and is disposed above the electromagnetic generating module 161 and thermally connected with the electromagnetic generating module 161, so as to increase the heat dissipation area of the electromagnetic generating module 161 and improve the heat dissipation efficiency of the electromagnetic generating module 161.

Figure 10:
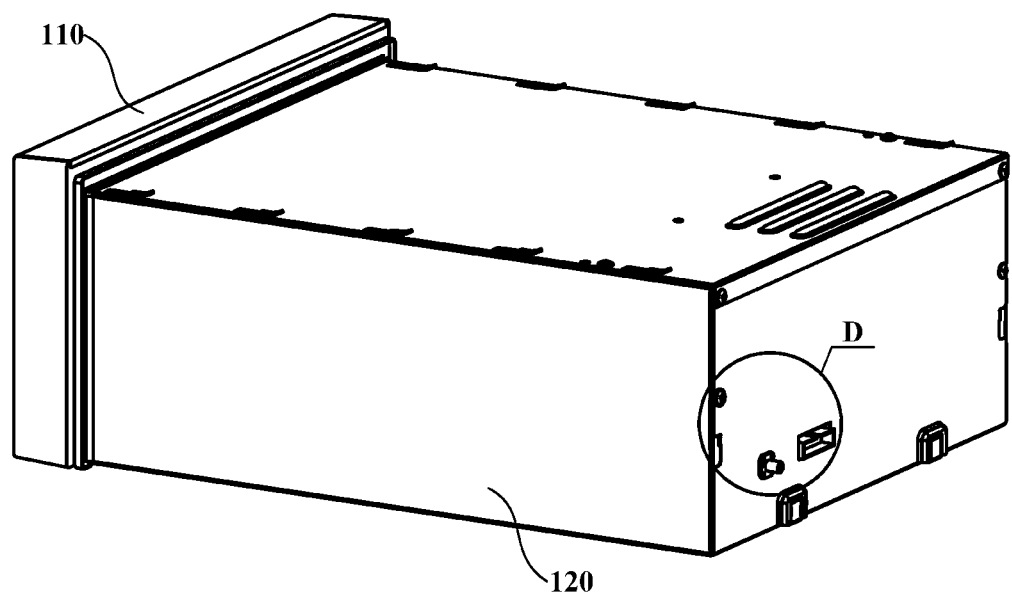
FIG. 10 is a schematic structural view of a part of a heating device located in a storage compartment when viewed from the rear to the front.
Figure 11:
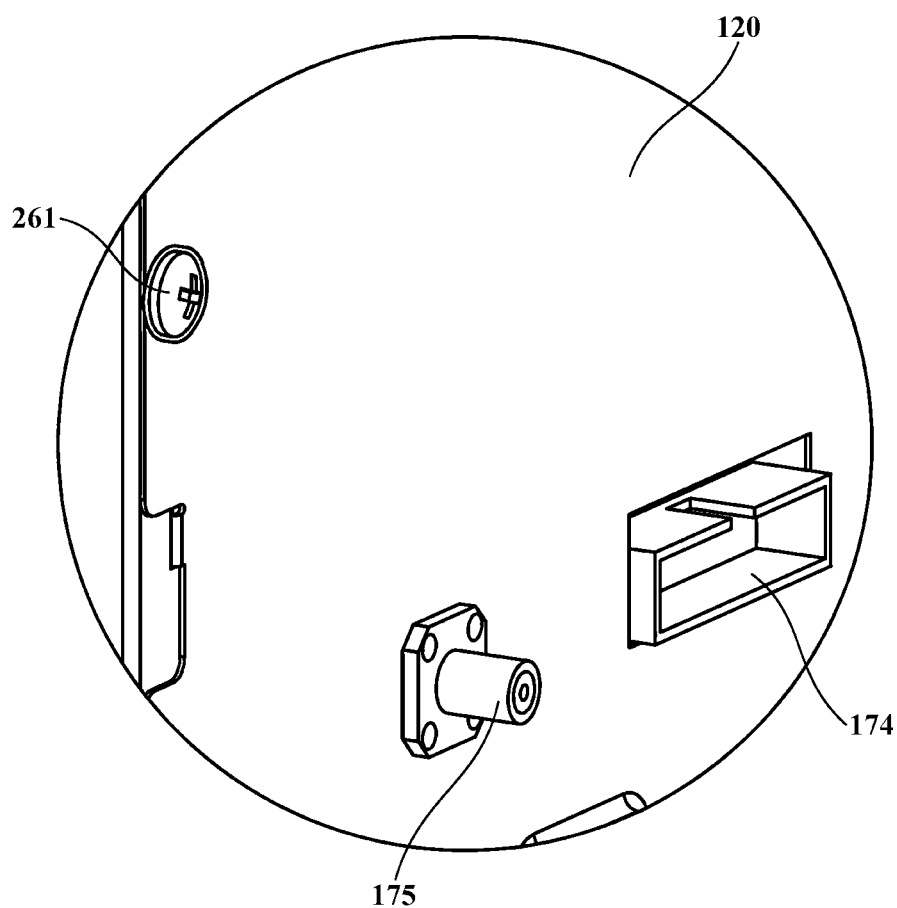
FIG. 11 is a schematic enlarged view of a region D in FIG. 10.

FIG. 10 is a schematic structural view of a part of a heating device located in a storage compartment when viewed from the rear to the front. FIG. 11 is a schematic enlarged view of a region D in FIG. 10. Referring to FIG. 4, FIG. 10 and FIG. 11, a part of the metal bracket 180 may be disposed at the rear part of the circuit board 170 and extend vertically along a lateral direction, and it may be provided with two wiring ports, so that a wiring terminal 175 of the detection unit 171 (or the matching unit 173) and a wiring terminal 174 of the control unit 172 respectively extend out from a wiring port, and are electrically connected with the electromagnetic generating module 161 through a signal transmission wire 251.

Specifically, the cylinder body 110 may be conductively connected with the bottom steel 231 through a lead wire 252 to guide the electric charges thereon to the bottom steel 231 so as to avoid potential safety hazards.

The signal transmission wire 251 and the lead wire 252 may be disposed in the insulating layer 210 in advance, and pass through the inner liner 220 and the bottom steel 231 to reserve wiring terminals in the freezing compartment 222 and the compressor chamber 2311 respectively, so that the signal transmission wire 251 and the lead wire 252 may be routed together so as to save the assembly cost.

Two wiring terminals of the lead wire 252 may be conductively connected with the cylinder body 110 and the bottom steel 231 respectively by a fastener 261 and a fastener 262. During assembly, a stable and reliable conductive connection of the lead wire 252 with the cylinder body 110 and the bottom steel 231 can be realized only by tightening the fasteners.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and recognized as covering all these other variations or modifications.

The invention claimed is:

1. A heating device configured to heat an object to be processed with electromagnetic waves, comprising:
   a cylinder body, provided with a pick-and-place opening and configured to place the object to be processed;
   a door body, disposed at the pick-and-place opening and configured to open and close the pick-and-place opening; and
   a radiating antenna, arranged in the cylinder body and configured to radiate the electromagnetic waves, wherein the heating device further comprises:
   a signal processing and measurement and control circuit, disposed at a rear lower part in the cylinder body, wherein the signal processing and measurement and control circuit is integrated on a circuit board; and
   wherein the heating device further comprises:
   a drawer for carrying the object to be processed disposed in the cylinder body; and
   a housing, disposed under a bottom wall of the drawer and configured to separate an inner space of the cylinder body into a heating chamber and an electrical appliance chamber under the heating chamber, wherein the object to be processed and the circuit board are respectively disposed in the heating chamber and the electrical appliance chamber;
   wherein a rear part of the bottom wall of the drawer and a rear part of the housing are both recessed upward to form an accommodating space which is located in the cylinder body and at the rear lower part of the cylinder body and is under the rear part of the bottom wall of the drawer and the rear part of the housing, and the circuit board is accommodated in the accommodating space, with a rear part of the inner space of the heating chamber being over the accommodating space and the circuit board.

2. The heating device according to claim 1, wherein the cylinder body is made of a metal and is configured to be grounded; and the heating device further comprises:
   a metal bracket, configured to connect the circuit board and the cylinder body.

3. The heating device according to claim 1, wherein the circuit board is horizontally disposed; and
   a clamping tongue extending upward and inward is respectively formed on two lateral side walls of the housing, and the circuit board is clamped above two clamping tongues.

4. A refrigerator, comprising:
   a cabinet, defining at least one storage compartment;
   at least one cabinet door, configured to open and close the at least one storage compartment;
   a refrigerating system, configured to provide cooling capacity to the at least one storage compartment; and
   a main control board, configured to control the refrigerating system to work, wherein the refrigerator further comprises:
   a heating device according to claim 1, disposed in one of the at least one storage compartment.

5. The heating device according to claim 1, wherein the radiating antenna is disposed in the electrical appliance chamber under the heating chamber.

6. The heating device according to claim 5, wherein the housing is made of non-transparent insulating material, and the electromagnetic waves generated by the radiating antenna pass through the housing to heat the object to be processed.

7. The heating device according to claim 5, wherein the radiating antenna is fixed to the housing.

8. The heating device according to claim 1, wherein the housing comprises a clapboard for separating the heating chamber and the electrical appliance chamber, and a skirt part fixedly connected with an inner wall of the cylinder body.

9. The heating device according to claim 8, wherein the housing further comprises a plurality of reinforcing ribs that connect the clapboard and the skirt part.

* * * * *